Patented Apr. 12, 1932

1,854,077

UNITED STATES PATENT OFFICE

FRITZ STRAUB, OF BASEL, SWITZERLAND, ASSIGNOR TO THE FIRM OF SOCIETY OF CHEMICAL INDUSTRY IN BASLE, OF BASEL, SWITZERLAND

CHROMIUM COMPOUNDS OF DYESTUFFS AND PROCESS OF MAKING SAME

No Drawing. Application filed August 21, 1928, Serial No. 301,163, and in Switzerland August 27, 1927.

The present invention relates to the manufacture of chromium compounds of dyestuffs. It comprises the process of making these compounds, the chromium compounds themselves, and the material dyed with the new products.

This invention is based on the observation that the chromium compounds soluble in water obtained from tri-aryl methane dyestuffs capable of being chromed, such as may be made as described in German specification No. 397331, are excellently suitable for dyeing a group of animal fibre comprising silk and leather. The dyeings obtained are distinguished by the purity of their tint and their good fastness to washing, alkali and water. The observation is the more surprising since these dyestuffs are not suitable for dyeing wool as they have too little affinity and do not produce fast dyeings.

It has further been observed that the chromium compounds of tri-arylmethane dyestuffs capable of being chromed, together with the chromium compounds of azo-dyestuffs capable of being chromed, dye animal fibres surprisingly fast. The dyeings thus produced are characterized by the purity of their tint and, in spite of the presence of a considerable proportion of their aryl-methane component which is very moderately fast to light, they exhibit good fastness to light. In many cases the new process leads to improvements in producing dyeings for artificial light. The process is particularly valuable for producing fast pure tints on silk and leather.

For obtaining these effects it is immaterial whether one dyes with the mixtures of dyestuffs or with the components in succession in separate baths or in the same bath. Mixtures of the dyestuffs may be dissolved in water and heated for some time, whereupon the product may be separated. The latter is suitable for dyeing in the same manner. The dyeing effects produced by the process are to be referred to the formation of new compounds which are produced, it may be, in the dye-bath, upon the fibre during the dyeing operation, or by the action of the components on one another in some other way.

The constitution of these dyestuffs containing chromium is not known.

The following examples illustrate the invention, the parts being by weight:—

Example 1

A dye-bath suitable for 100 parts of ordinary or weighted silk is prepared with 1 part of the chromium compound of the dyestuff from Chrome Azurol S (cf. Schultz, Farbstofftabellen, 5th edition, page 184, No. 554) or of the chromium compound of the dyestuff acid of the formula

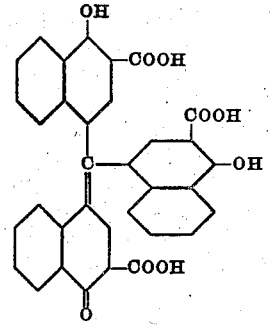

made as described in the U. S. specification No. 1,387,596, and with 1 part of the chromium compound from 1-diazo-2-naphthol-4-sulfonic acid and α-naphthol of the formula

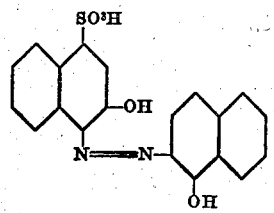

(which may be made as described in U. S. specification No. 1,221,849) and 5–6 parts of acetic acid. The goods are introduced at 50–60° C. and the bath is heated gradually to 80° C. and then kept at this temperature for ¾ to 1 hour. The goods are then washed, brightened and dried. The silk is dyed pure blue tints of a very good color in artificial light; the dyeings are very fast to washing, water, alkali and light, notwithstanding that one of the components, amounting to 50 per cent, is a triphenyl methane dyestuff which is not fast to light.

Similar coloristic results are obtained by dissolving 10 parts of the chromium compound of the azo-dyestuff from 1-diazo-2-naphthol-4-sulfonic acid and α-naphthol in 200 parts of boiling water, adding to this solution a solution of 2 parts of the chromium compound of the dyestuff from Chrome Azurol S or the chromium compound of the dyestuff acid made as described in the U. S. specification No. 1,387,596, Example 2, and stirring the mixture, while boiling, until a homogeneous blue solution is produced. This may be used directly for dyeing or the new chromium compound can be separated from it by evaporation and salting out. The said chromium compound is a bronze dark powder which dissolves in water to a blue solution; in 10 per cent. caustic soda solution to a blue-violet solution and in concentrated sulfuric acid to a green-blue solution.

If instead of the chromium compound of the Chrome Azurol S there is used in this example the chromium compounds of Eriochrome Azurol B, which is with difficulty soluble in water (cf. Schultz, Farbstofftabellen, 5th edition, page 184, No. 551), there is obtained a product which dyes the animal fiber pure blue tints of good fastness properties.

The chromium compound from Eriochrome Azurol B may be obtained by dissolving 5.15 parts of the sodium salt of the dyestuff in 100 parts of boiling water and heating the solution with 2.28 parts of chromium oxide in the form of a solution of chromium fluoride for a long time. By filtering by suction and washing with water, the dyestuff is purified from excess of chromium.

Example 2

100 parts of ordinary or weighted silk are first dyed with 0.4 part of the chromium compound of Chrome Azurol S in the presence of acetic acid for about 1 hour, and are then further dyed with 1.6 part of the chromium compound of the dyestuff from 1-diazo-2-naphthol-4-sulfonic acid and α-naphthol. Or it is first dyed with 1.6 part of the chromium compound of the said azo-dyestuff and then with 0.4 part of the chromium compound of the triphenyl methane-dyestuff. There is obtained a pure blue tint, very fast to washing, alkali, water and light.

Example 3

A dye-bath is prepared in which is dissolved 1 part of the chromium compound of the dyestuff Eriochrome Cyanine R of the formula

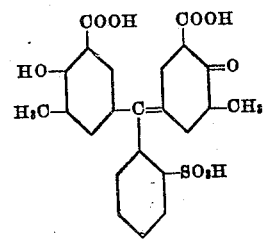

(cf. Schultz, Farbstofftabellen, 5th edition, page 184, No. 553). To this bath there are added 5–6 parts of acetic acid, and the goods to be dyed, consisting of 100 parts of ordinary or weighted silk, are entered at 50–60° C. The whole is heated slowly to 80° C. which temperature is kept for ¾ to 1 hour. The dyed material is then washed, brightened in the usual manner, and dried. The silk is dyed pure violet-blue tints of good fastness properties.

Example 4

A dye-bath is prepared in which are dissolved 2 parts of the chromium compound of Chrome Azurol S (cf. Schultz, Farbstofftabellen, 5th edition, page 184, No. 554) and 5–6 parts of acetic acid. 100 parts of ordinary or weighted silk are introduced at 50–60° C. and the bath is heated gradually to 80° C. and kept at this temperature for ¾ to 1 hour. The goods are then washed, brightened as usual and dried. The silk is dyed blue tints, very fast to washing, water and alkali.

Example 5

100 parts of box calf are dyed under neutral conditions and at 60° C. for 40 minutes in a bath consisting of 200 parts of water and 0.25–0.5 part of the chromium compound of Chrome Azurol S or the chromium compound of the dyestuff acid of the above mentioned formula made as described in the U. S. specification No. 1,387,596, Example 2. After the usual finishing processes there is obtained a blue tint of good fastness properties.

Like blue tints are obtained when leather is dyed with the chromium compound from 1-diazo-2-naphthol-4-sulfonic acid and α-naphthol and the chromium compound of Chrome Azurol S or the chromium compound of the dyestuff acid made as described in the U. S. specification No. 1,387,596, Example 2, in succession or simultaneously.

Example 6

A dye-bath suitable for 100 parts of ordinary or weighted silk is prepared with 1 part of the chromium compound of the dyestuff from Eriochrome Cyanine R, 2 parts of the chromium compound from 1-diazo-2-napthol-4-sulfonic acid and β-napthol (which may be made as described in specification No. 1,221,849), and 5-6 parts of acetic acid. The goods are introduced at 50-60° C. and the bath is heated gradually to 80° C. and then kept at this temperature for ¾ to 1 hour. The goods are then washed, brightened and dried. The silk is dyed violet-brown tints of good fastness properties.

What I claim is:—

1. A process for the manufacture of fast tints on silk and leather, consisting in dyeing these materials with dissolved chromium compounds of tri-arylmethane dyestuffs capable of being chromed, with addition of chromium compounds of such ortho-hydroxy-azo-dyestuffs which derive from diazotized 1-amino-2-hydroxynaphthalene-4-sulfonic acids and naphthols.

2. A process for the manufacture of fast tints on silk and leather, consisting in dyeing these materials with dissolved chromium compounds of tri-arylmethane dyestuffs capable of being chromed, with addition of chromium compounds of such ortho-hydroxy-azo-dyestuffs which derive from diazotized 1-amino-2-hydroxynaphthalene-4-sulfonic acids and naphthols, the two chromium compounds being used in the form of the complexes resulting from the two compounds.

3. A process for the manufacture of fast tints on silk and leather, consisting in causing chromium compounds of dyestuffs of the triaryl methane series capable of being chromed to act on water soluble chromium compounds of such ortho-hydroxy-azo-dyestuffs which derive from diazotized 1-amino-2-hydroxynaphthalene-4-sulfonic acids and naphthols, and dyeing the said material with the dyestuffs thus produced.

4. A process for the manufacture of fast tints on silk and leather, consisting in causing chromium compounds of dyestuffs of the triaryl methane series capable of being chromed to act on the fiber on water soluble chromium compounds of such ortho-hydroxy-azo-dyestuffs which derive from diazotized 1-amino-2-hydroxynaphthalene-4-sulfonic acids and naphthols.

In witness whereof I have hereunto signed my name this 7th day of August, 1928.

FRITZ STRAUB.